United States Patent
Cholet et al.

(10) Patent No.: US 7,565,963 B2
(45) Date of Patent: Jul. 28, 2009

(54) DEVICE ALLOWING FOR THE INDIVIDUAL DISTRIBUTION OF SMALL STICK-SHAPED OBJECTS

(75) Inventors: Georges Cholet, Ormes (FR); Gwennaël Verstichel, Amilly (FR); Cédric Lucas, Fleury les Aubrais (FR)

(73) Assignee: Societe Nationale d'Exploitation Industrielle des Tabacs et Allumettes (Seita), Paris Cedex (FR)

( * ) Notice: Subject to any disclaimer, the term of this patent is extended or adjusted under 35 U.S.C. 154(b) by 34 days.

(21) Appl. No.: 11/963,455

(22) Filed: Dec. 21, 2007

(65) Prior Publication Data

US 2008/0149462 A1    Jun. 26, 2008

(30) Foreign Application Priority Data

Dec. 21, 2006   (FR)   ................................. 06 11215

(51) Int. Cl.
*B65G 47/30*    (2006.01)
(52) U.S. Cl. .................... 198/560; 198/419.3; 198/525; 198/550.1
(58) Field of Classification Search .............. 198/419.3, 198/459.2, 525, 550.01, 550.3, 560, 569, 198/698
See application file for complete search history.

(56) References Cited

U.S. PATENT DOCUMENTS

| | | | | |
|---|---|---|---|---|
| 3,095,097 A | * | 6/1963 | Mellow | 414/21 |
| 3,253,491 A | * | 5/1966 | Rakowicz et al. | 83/411.6 |
| 3,405,579 A | * | 10/1968 | London | 83/102 |
| 3,477,283 A | * | 11/1969 | Cyrl | 73/84 |
| 3,565,237 A | * | 2/1971 | Strydom | 198/572 |
| 3,590,981 A | * | 7/1971 | Adrian | 198/534 |
| 3,887,059 A | * | 6/1975 | Verjux | 198/450 |
| 4,296,660 A | * | 10/1981 | Cristiani | 83/100 |
| 4,751,996 A | * | 6/1988 | Knecht | 198/347.1 |
| 4,766,991 A | * | 8/1988 | Gherardi | 198/455 |
| 6,290,055 B1 | * | 9/2001 | Glorfield | 198/532 |

* cited by examiner

*Primary Examiner*—Mark A Deuble
(74) *Attorney, Agent, or Firm*—Browdy and Neimark, P.L.L.C.

(57) ABSTRACT

The invention relates to a device (1) for the individual distribution of small stick-shaped objects (7), this device (1) making use of:
- a conveyor (2) comprising an endless conveyor belt (3) circulating around at least two pulleys or rollers (4, 4'), the outer side of this belt (3) being provided with transversal separators (5) which delimit a succession of compartments (6);
- a hopper (9) wherein the small stick-shaped objects (7) contained in compartments (6) are successively dumped;
- an individual distributor (10) arranged in the base of hopper (9) and wherein the small stick-shaped objects (7) become engaged via gravity, and comprising:
- a support and guide casing (8) comprising a semi-cylindrical form, substantially coaxial to the downstream pulley (4'), this casing (8) being oriented in such a way that it maintains the small stick-shaped objects (7) inside their respective compartments (6) during the passing of the belt (3) on said pulley (4');
- a flexible vertical partition (11) separating the internal space of hopper (9) into two communicating sub-portions (12, 12').

13 Claims, 3 Drawing Sheets

DEVICE ALLOWING FOR THE INDIVIDUAL DISTRIBUTION OF SMALL STICK-SHAPED OBJECTS

BACKGROUND OF THE INVENTION

1. Field of the Invention

This invention concerns a device allowing for the individual distribution of small stick-shaped objects. This invention relates more specifically but not exclusively, to an automatic distributor allowing for the loading of cigarettes or cigarette filters into a measurement station.

2. Description of the Prior Art

It is known that loaders of small stick-shaped objects such as cigarettes or cigarette filters already exist, these loaders generally comprising a conveyor belt that comprises separators on the upper surface thereon making it possible to define compartments wherein the cigarettes or said filters are arranged perpendicularly to the displacement axis of the belt. In this way, a translation of the conveyor belt allows each compartment to be successively carried over or next to a container of a measurement station wherein said cigarettes or said cigarette filters can be transferred.

Moreover, these devices generally make use of pushing mechanisms making it possible to load small stick-shaped objects into said container. It has been shown that this solution has a certain number of drawbacks.

For instance, during the transfer, the small stick-shaped objects tend to tip and to be arranged in random fashion in the container of the measurement device This results in a major risk of jamming in this container and of deteriorating the cigarettes or filters. The use of pushing mechanisms and control circuits suitable to these mechanisms as well as the resulting complexity of the overall device consequently leads to a relatively high cost price, risks of malfunction and difficulties concerning adjustments and maintenance.

OBJECT OF THE INVENTION

The purpose of this invention is therefore more particularly to suppress these disadvantages. It proposes a loader making it possible to distribute small stick-shaped objects into a container of a device such as a measurement station without requiring the use of pushing mechanisms, which in particular makes it possible to simplify mechanical adjustments, reduce production and maintenance costs, and to ensure that during the transfer between the compartments and the container the cigarettes or filters are oriented in parallel to one another.

SUMMARY OF THE INVENTION

To that effect, the invention proposes a device for the individual distribution of small stick-shaped objects, this device making use of:
- a conveyor comprising an endless conveyor belt circulating around at least two pulleys or rollers respectively upstream and downstream of which at least one is driven by an motor, the outer side of this belt being provided with transversal separators which delimit a succession of compartments wherein the small stick-shaped objects are arranged;
- a hopper wherein the small stick-shaped objects contained in the compartments are successively dumped;
- an individual distributor arranged in the base of the hopper and wherein the small stick-shaped objects become engaged via gravity.

According to the invention, this device is characterised in that it comprises:
- a support and guide easing comprising a semi-cylindrical form, substantially coaxial to the downstream pulley and the radius of which is substantially equal to the sum of the radius of the pulley and of the height of the separators, this casing being oriented in such a way that it maintains small stick-shaped objects inside their respective compartments during the passing of the belt on said pulley;
- a flexible vertical partition separating the internal space of the hopper into two communicating sub-portions, the vertical axis of this partition and the lower end of said casing being substantially coaxial.

In this way, at each displacement of the conveyor belt corresponding to one step, the small stick-shaped objects contained in the compartment positioned above the hopper are transferred in a controlled way into the corresponding sub-portion of the hopper, before becoming engaged in the individual distributor.

Advantageously, the device according to the invention can comprise at least two sensors, such as photoelectric cells, making it possible on the one hand to ensure that the conveyor belt stops at each advance of one step according to the marks defined and on the other hand, to detect the transfer of the small stick-shaped objects into the hopper.

Advantageously, the conveyor can in particular be arranged according to a substantially horizontal or vertical axis. In this latter case, the support and guide casing is substantially coaxial to the upstream pulley, said separators of the conveyor belt are arranged obliquely and the hopper is arranged laterally in the vicinity of the upper portion of the conveyor.

BRIEF DESCRIPTION OF THE DRAWINGS

Modes for executing the invention shall be described hereinafter, by way of non-exhaustive examples, with reference to the annexed drawings, wherein.

DESCRIPTION OF THE PREFERRED EMBODIMENTS

Figure 1:
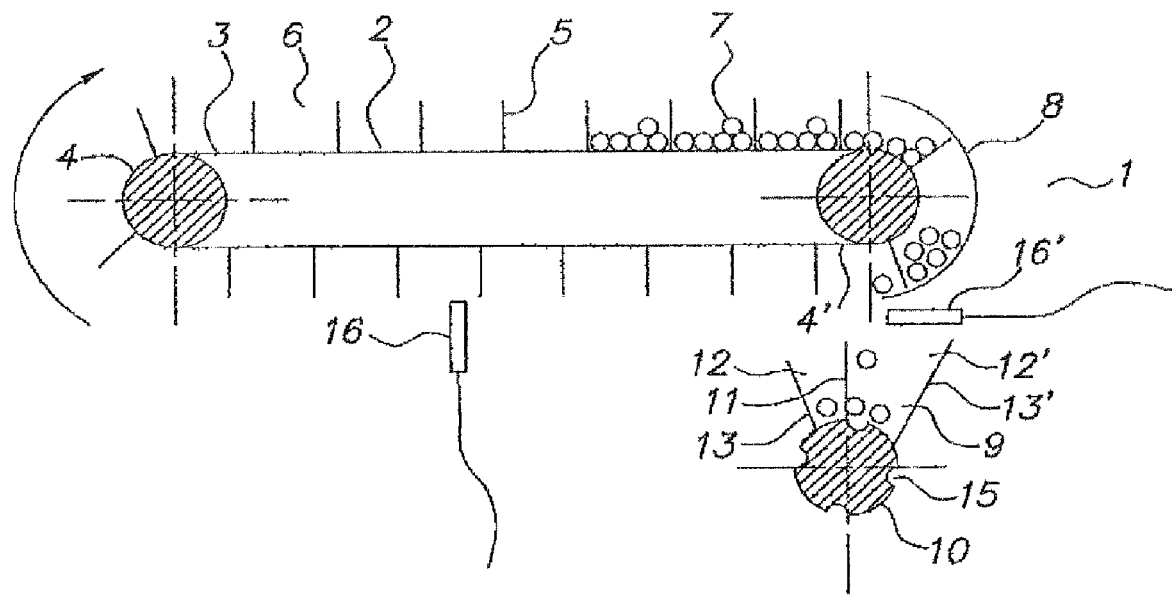
FIG. 1 is a schematic representation of the device according to the invention for the individual distribution of small stick-shaped objects, this device comprising a conveyor centred horizontally.

In this example, such as is shown in FIG. 1, the device according to the invention 1 comprises a conveyor 2 arranged according to a substantially horizontal axis, this conveyor 2 comprising an endless conveyor belt 3 circulating around two pulleys or rollers 4, 4' respectively upstream and downstream of which at least one is driven by a motor (not shown).

The outer side of this endless conveyor belt 3 comprises transversal separators 5 which delimit a succession of compartments 6 wherein small stick-shaped objects 7 are arranged. In this example, endless conveyor belt 3 circulates in a clockwise direction.

The device according to the invention 1 also comprises a support and guide casing 8 comprising a semi-cylindrical form, substantially coaxial to the downstream pulley 4' and of which the radius is substantially equal to the sum of the radius of pulley 4' and of the height of separators 5, this casing 8 being oriented in such a way that it maintains small stick-shaped objects 7 inside their respective compartments 6 during the passing of belt 3 on said pulley 4'.

Figure 2:
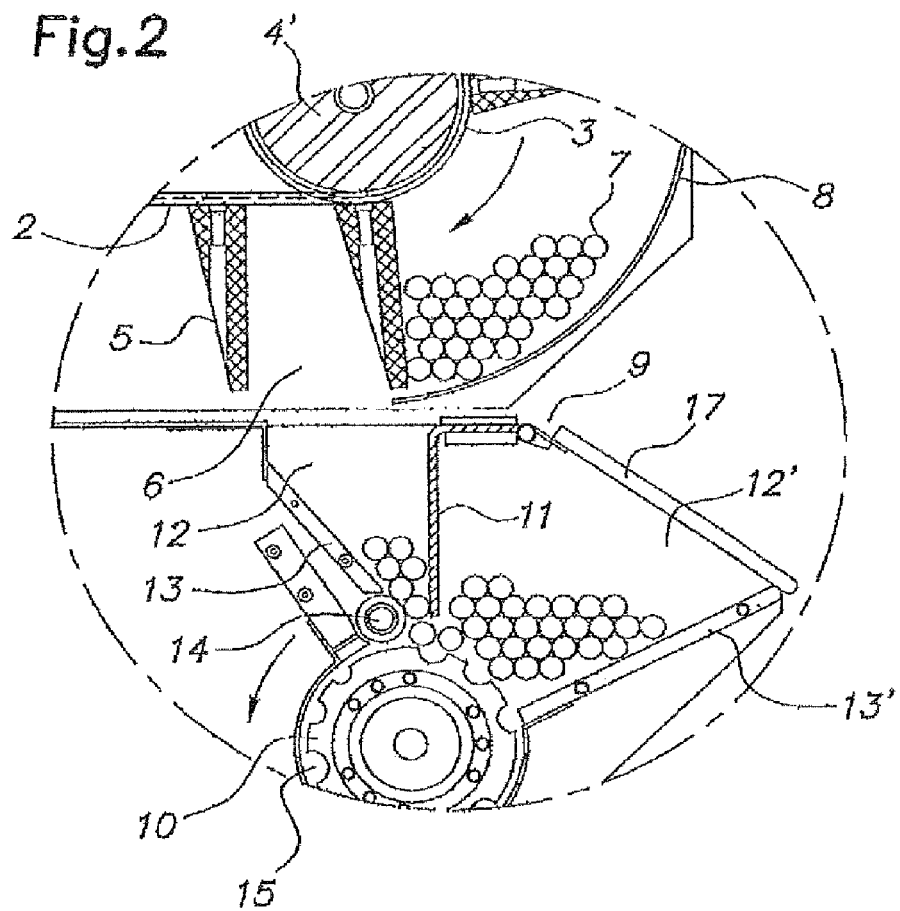
FIG. 2 is a schematic representation of the hopper, of a portion of the casing and of a pulley of the device according to the invention shown in FIG. 1.

In addition, the device according to the invention 1 comprises a hopper 9 wherein the small stick-shaped objects 7 contained in compartments 6 are successively dumped. This hopper 9 comprises:

- an individual distributor 10 arranged in the base of hopper 9 and wherein the small stick-shaped objects 7 become engaged via gravity, this individual distributor 10 able to be controlled by a motor (not shown); such as is shown in FIG. 2, this distributor 10 substantially has the form of a cylindrical and mobile magazine around the axis thereof (here, in the anticlockwise direction), this distributor 10 comprising on the upper surface thereof coaxial slots 15 which substantially have a semi-cylindrical form and of which the diameter is substantially equal to that of a small-stick shaped object 7;
- a flexible vertical partition 11 able to be of metal mesh and which separates the internal space of hopper 9 into two communicating sub-portions 12, 12', the lower portion of this vertical partition 11 and said individual distributor 10 being separated by a distance that is substantially equal to the diameter of small-stick shaped object 7. In addition, the vertical axis of this partition 11 and the lower end of said casing 8 are substantially coaxial,
- lateral walls 13, 13' which are preferably oblique in relation to vertical partition 11 as such, such as is shown in FIG. 2, the portion 12 of hopper 9 located to the left of vertical partition 11 substantially has the shape of a funnel.

Hopper 9 can also comprise a cylindrical and mobile device around the axis thereof 14 (here, in the anticlockwise direction) sealing the space contained between the lower end of the left lateral wall 13 and the individual distributor 10, the minimum distance that separates this device 14 from vertical partition 11 being substantially equal to the diameter of small-stick shaped object 7.

In this way, after having triggered the start of conveyor belt 3 (by activating for example the motor driving at least one pulley or one roller 4, 4') and filled with small stick-shaped objects 7 the upper compartments 6 of conveyor 2, the small stick-shaped objects 7 contained in compartment 6 located furthest downstream in casing 8 fall into portion 12 of hopper 9 located to the left of vertical partition 11 in FIG. 2.

As such, at each displacement of conveyor belt 3 corresponding to a step, the small stick-shaped objects 7 contained in this compartment 6 positioned above hopper 9 are transferred in a controlled way into said portion 12 of hopper 9, before becoming engaged by gravity in the individual distributor 10.

Advantageously, the displacement speed of conveyor belt 3 can be controlled so as to make it possible for said small stick-shaped objects 7 to fall one by one into said portion 12 of hopper 9. This controlling of the displacement speed of conveyor belt 3 associated with funnel shape of portion 12 of hopper 9, with the characteristics of flexible vertical partition 11 and with the presence of the cylindrical and mobile device around the axis thereof 14 makes it possible to optimally control the transfer and the distribution of the small stick-shaped objects 7 in hopper 9, as well as their engaging in the individual distributor 10 of which the rotation is controlled.

At the end of displacement of conveyor belt 3 corresponding to one step, all of the small stick-shaped objects 7 contained in said compartment 6 have been transferred into hopper 9, the displacement of conveyor belt 3 able to be suspended until all of these objects 7 have been evacuated by individual distributor 10.

Advantageously, the device according to the invention 1 can comprise at least two sensors 16, 16', such as photoelectric cells, making it possible:

- to ensure that conveyor belt 3 stops at each advance of one step according to the marks defined as such, the marks are defined in such a way that at each stopping of conveyor belt 3 one of said compartments 6 is located above portion 12 of hopper 9 located to the left, in the example shown in FIG. 2, of vertical partition 11; and
- to detect the transfer of the small stick-shaped objects 7 into hopper 9, sensor 16' then being positioned between the lower portion of casing 8 and hopper 9.

Portion 12' of hopper 9 shown to the right of vertical partition 11 in FIG. 2 can comprise a lid 17 that when raised makes it possible to fill said portion 12' of hopper 9 with small stick-shaped objects 7. In this way, these small stick-shaped objects 7 can be distributed by the individual distributor 10 without having been loaded beforehand into compartments 6 of conveyor 2.

Conveyor 2 can be contained within an enclosure (not shown) in order to protect it as well as the small stick-shaped objects 7. Advantageously, this enclosure can comprise at least on the upper portion thereof, trap doors arranged so as to be in the axis of compartments 6 when conveyor 1 is idle, the device according to the invention 1 able to comprise an inductive sensor (not shown) making it possible to detect the opening of said trap doors.

Advantageously, conveyor 2 can be controlled by a control station (not shown).

Figure 3:
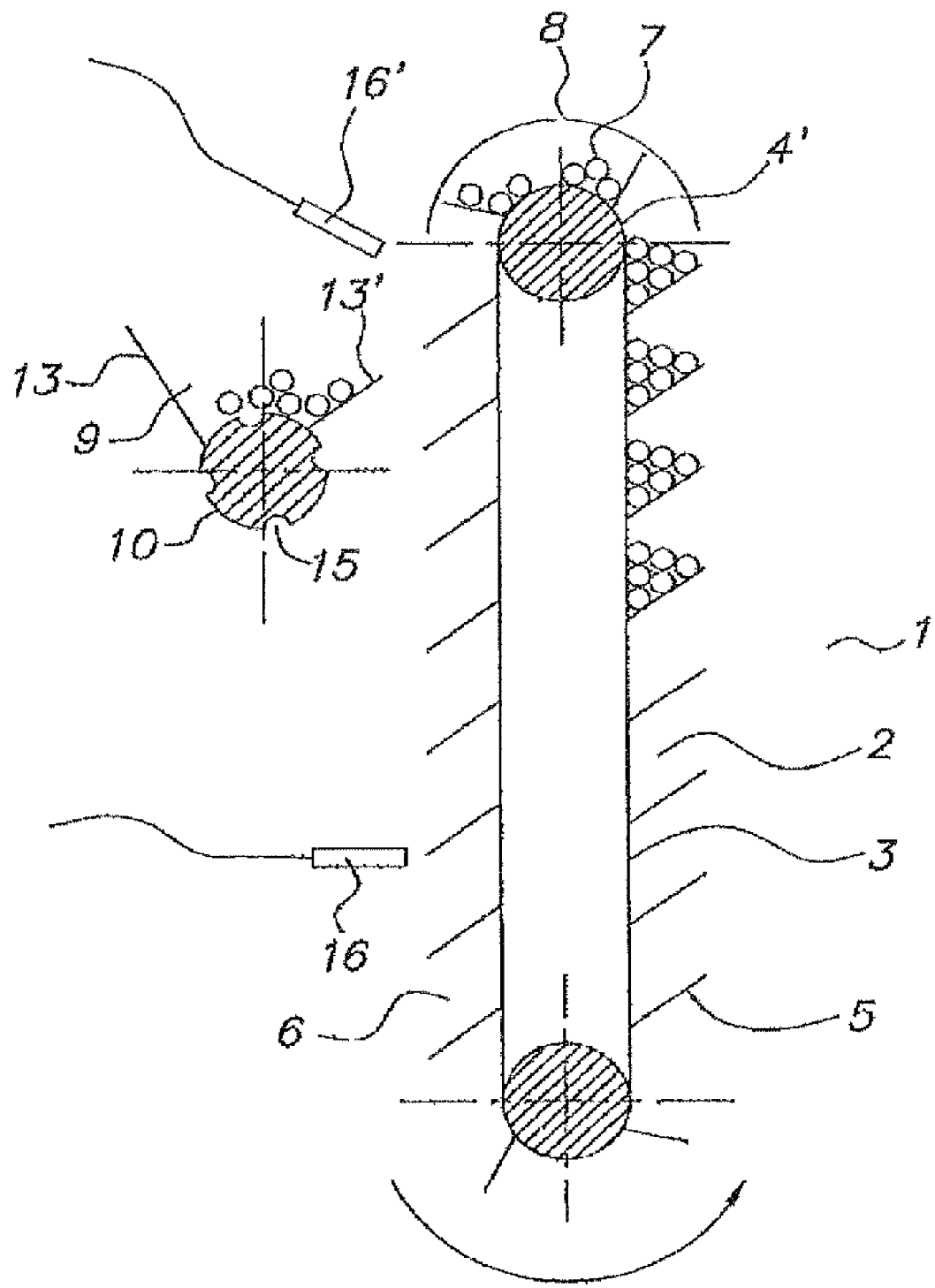
FIG. 3 is a schematic representation of the device according to the invention for the individual distribution of small stick-shaped objects, this device comprising a conveyor centred vertically.
Figure 4:
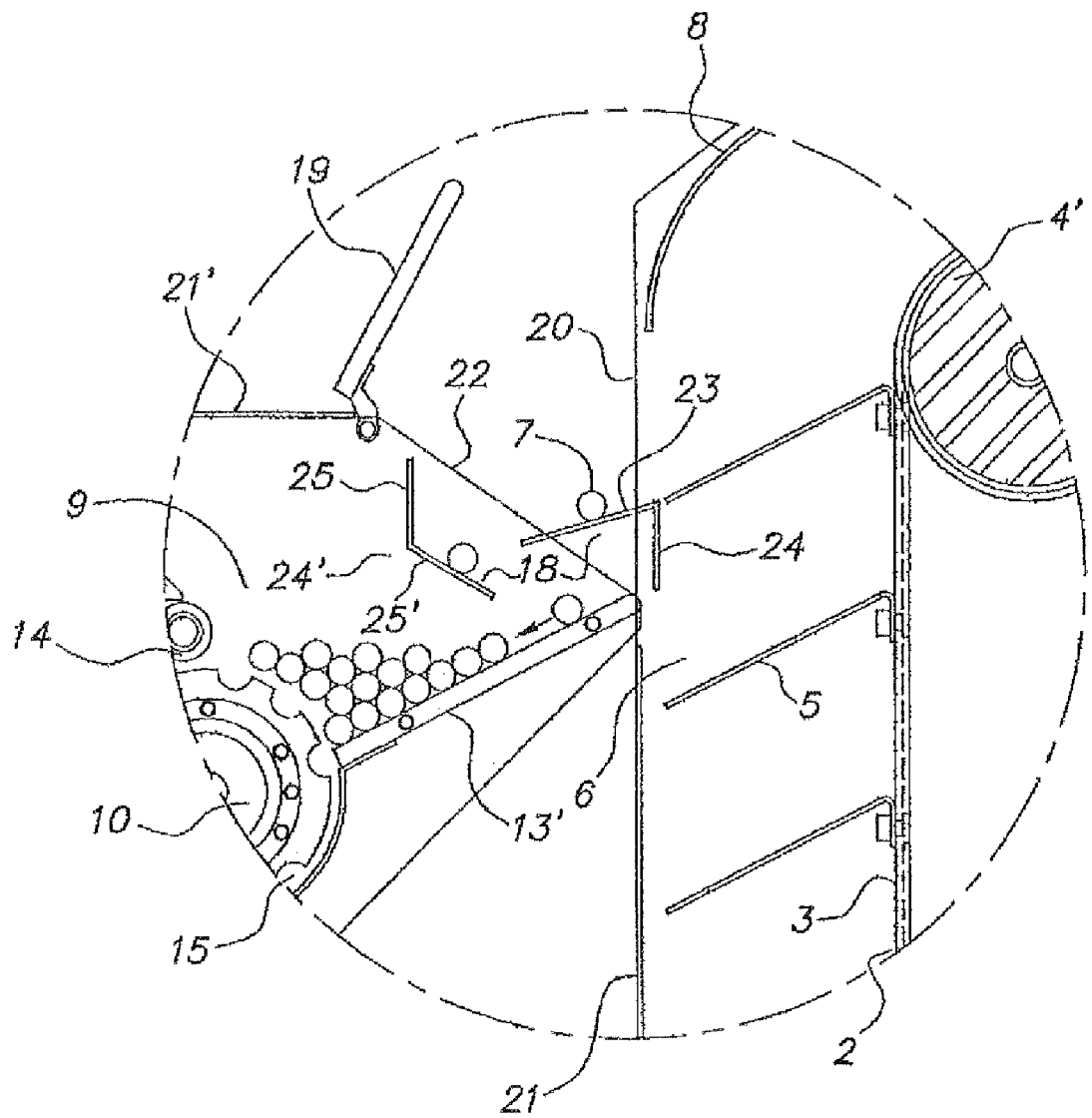
FIG. 4 is a schematic representation of the hopper, of a portion of the casing and of a pulley of the device according to the invention shown in FIG. 3.

According to an alternative execution such as is shown in FIGS. 3 and 4, conveyor 2 of the device according to the invention 1 can be arranged according to a substantially vertical axis and have in this case the following particularities, knowing that in the specific case conveyor belt 3 moves in the anticlockwise direction:

- support and guide casing 8 is substantially coaxial to upstream pulley 4;
- said separators 5 of conveyor belt 3 are arranged obliquely in such a way that they are directed upwards when they are on the ascending side of conveyor belt 3 (in FIG. 3, the side on the right) and downwards when they are on the descending side (in FIG. 3, the side on the left); and
- hopper 9 is arranged laterally, in the vicinity of the upper portion of conveyor 2 and on the side where the descending side of conveyor belt 3 is located.

In order to allow all of the small stick-shaped objects 7 contained in compartment 6 that become engaged in the descent, to be transferred into hopper 9, the lateral wall 13' of this hopper 9 located opposite the descending side of conveyor belt 3 can be oblique and substantially parallel to separators 5 located on the descending side of this conveyor belt 3.

Hopper 9 can comprise:

- an individual distributor 10 of the aforementioned type which is arranged in the base thereof;
- two lateral walls 13, 13';
- a cylindrical and mobile device around the axis thereof 14 of the aforementioned type, sealing the space contained between the lower end of lateral wall 13 which is shown on the left in FIG. 3 and the individual distributor 10.

Hopper 9 as well as conveyor 2 can each be contained within a distinct enclosure 21, 21' so as to protect them. In this case, the device according to the invention 1 has the following specificities:

enclosure 21 of conveyor 2 comprises an opening 20 located in the vicinity of the apex of conveyor 2 and arranged on the side where the descending side of conveyor belt 3 is located, hopper 9 comprises a flip-down lid 19 which makes it possible to access its inner space via an opening 22, this lid 19 being arranged in such a way as to be in closed position opposite said opening 20 in order to allow for the passing of the small stick-shaped objects 7 from compartments 6 to hopper 9 when said lid 19 is raised Advantageously, in order to prove optimal guiding of the small stick-shaped objects 7 when they are transferred into hopper 9, the device according to the invention 1 can comprise a baffle 18 comprising:

a first element 24 fixed on the outer side of enclosure 21 of conveyor 2, at the base of said opening 20; this first element 24 comprises an extension 23 directed towards opening 22 of hopper 9 and of which the slope is preferably less accentuated than that of separators 5 located on the descending side of conveyor 2 in order to slow down the travel of the small stick-shaped objects 7 during their transfer into hopper 9;

a second element 24' contained in hopper 9 and comprising:

a first sub-element 25 fixed to enclosure 21' of hopper 9;

a second sub-element 25' extending in the direction of said lateral wall 13' of hopper 9 and arranged in such a way that the falling point of the small stick-shaped objects 7 onto this second sub-element 25' is at a reduced distance from the lower end of extension 23 of the first element 24, and in that the lower end of this second sub-element 25' is in the vicinity of said lateral wall 13' of hopper 9.

In this way, thanks to this baffle 18, the flow control of the small stick-shaped objects 7 dumped into hopper 9 and their falling speed is optimised.

The device according to this alternative execution of the invention 1 can comprise:

a sensor 16 of the aforementioned type making it possible to ensure that conveyor belt 3 stops at each advance of one step according to defined marks; and a sensor 16' of the aforementioned type making it possible to detect the transfer of the small stick-shaped objects 7 into hopper 9, sensor 16' then being positioned between the lower portion of casing 8 and hopper 9.

In this way, at each displacement of conveyor belt 3 corresponding to one step, the small stick-shaped objects 7 contained in the compartment 6 which is positioned above hopper 9, are transferred in a controlled way into said hopper 9, before becoming engaged via gravity in individual distributor 10, with guidance for their falling into hopper 9 being optimised by the presence of said baffle 18.

The invention claimed is:

1. Device for the individual distribution of small stick-shaped objects, this device making use of:

a conveyor comprising an endless conveyor belt circulating around at least two pulleys or rollers respectively upstream and downstream of which at least one is driven by a motor, the outer side of said belt being provided with transversal separators which delimit a succession of compartments wherein the small stick-shaped objects are arranged;

a hopper wherein the small stick-shaped objects contained in said compartments are successively dumped;

an individual distributor arranged in the base of said hopper and wherein said small stick-shaped objects become engaged via gravity, a support and guide casing comprising a semi-cylindrical form, substantially coaxial to said downstream pulley and of which the radius is substantially equal to the sum of the radius of said pulley and of the height of the separators, this casing being oriented in such a way that it maintains the small stick-shaped objects inside their respective compartments during the passing of the belt on said pulley;

a flexible vertical partition separating the internal space of said hopper into two communicating sub-portions, the vertical axis of this partition and the lower end of said casing being substantially coaxial.

2. Device for the individual distribution of small stick-shaped objects according to claim 1, wherein the individual distributor is controlled by a motor, said device substantially having the form of a cylindrical and mobile magazine around the axis thereof, and comprising on the upper surface thereof coaxial slots which substantially have a semi-cylindrical form and of which the diameter is substantially equal to that of a small-stick shaped object.

3. Device for the individual distribution of small stick-shaped objects according to claim 1, wherein the lower portion of said vertical partition and said individual distributor are separated by a distance that is substantially equal to the diameter of small-stick shaped object.

4. Device for the individual distribution of small stick-shaped objects according to claim 1, wherein said hopper comprises lateral walls which are preferably oblique in relation to said vertical partition.

5. Device for the individual distribution of small stick-shaped objects according to claim 4, wherein said hopper comprises a cylindrical and mobile device around the axis thereof sealing the space contained between the lower end of said lateral wall and the individual distributor, the minimum distance that separates this device from vertical partition being substantially equal to the diameter of small-stick shaped object.

6. Device for the individual distribution of small stick-shaped objects according to claim 4, wherein said conveyor is arranged according to a substantially vertical axis and has the following particularities:

said support and guide casing is substantially coaxial to the upstream pulley;

said separators of said conveyor belt are arranged obliquely in such a way that they are directed upwards when they are on the ascending side of said conveyor belt and downwards when they are on the descending side; and said hopper is arranged laterally, in the vicinity of the upper portion of said conveyor and on the side where the descending side of said conveyor belt is located, the lateral wall of this hopper located opposite the descending side of said conveyor belt able to be oblique and substantially parallel to said separators which are located on the descending side of this conveyor belt.

7. Device for the individual distribution of small stick-shaped objects according to claim 6, wherein said hopper as well as said conveyor are each contained within a distinct enclosure in order to protect them, in this case:

said enclosure of said conveyor comprises an opening located in the vicinity of the apex of said conveyor and arranged on the side where the descending side of said conveyor belt is located;

said hopper comprises a flip-down lid which makes it possible to access its inner space via an opening, this lid being arranged so as to be in closed position opposite said opening in order to allow for the passing of the small stick-shaped objects from compartments to said hopper when said lid is raised.

8. Device for the individual distribution of small stick-shaped objects according to claim 7, comprising a baffle comprising:

a first element fixed on the outer side of said enclosure of said conveyor, at the base of said opening; this first element comprising an extension directed towards the opening of said hopper and of which the slope is preferably less accentuated than that of said separators located on the descending side of said conveyor in order to slow down the travel of the small stick-shaped objects during their transfer into said hopper;

a second element contained in said hopper and comprising:

a first sub-element fixed to said enclosure of said hopper;

a second sub-element extending in the direction of said lateral wall of said hopper and arranged in such a way that the falling point of the small stick-shaped objects onto this second sub-element is at a reduced distance from the lower end of extension of the first element, the lower end of this second sub-element being in the vicinity of said lateral wall of said hopper.

9. Device for the individual distribution of small stick-shaped objects according to claim 1, wherein the displacement speed of said conveyor belt is controlled so as to make it possible for said small stick-shaped objects to fall one by one into one of said sub-portions of said hopper.

10. Device for the individual distribution of small stick-shaped objects according to claim 1, comprising at least two sensors adapted:

to ensure that said conveyor belt stops at each advance of one step according to defined marks, the marks being defined in such a way that at each stopping of said conveyor belt one of said compartments is located above said hopper; and to detect the transfer of the small stick-shaped objects into said hopper, said sensor then being positioned between the lower portion of said casing and said hopper.

11. Device for the individual distribution of small stick-shaped objects according to claim 1, wherein one of said sub-portions of said hopper comprises a lid which when raised, makes it possible to fill said portion of said hopper with small stick-shaped objects.

12. Device for the individual distribution of small stick-shaped objects according to claim 1, wherein said conveyor is contained within an enclosure in order to protect it as well as the small stick-shaped objects, this enclosure comprising at least on the upper portion thereof, trap doors arranged so as to be in the axis of said compartments when said conveyor is idle, said device further comprising an inductive sensor making it possible to detect the opening of said trap doors.

13. Device for the individual distribution of small stick-shaped objects according to claim 1, wherein said conveyor is controlled by a control station.

* * * * *